United States Patent [19]
Snell

[11] Patent Number: 5,996,935
[45] Date of Patent: Dec. 7, 1999

[54] POWER PLANTS

[75] Inventor: Leonard Stanley Snell, Bristol, United Kingdom

[73] Assignee: Astovl Limited, Gloucester, United Kingdom

[21] Appl. No.: 08/871,880

[22] Filed: Jun. 2, 1997

[30] Foreign Application Priority Data

| May 31, 1996 | [GB] | United Kingdom | 9611366 |
| Jan. 10, 1997 | [GB] | United Kingdom | 9700438 |

[51] Int. Cl.$^6$ .................................................. F02K 1/00
[52] U.S. Cl. ....................................... 244/53 R; 60/226.2
[58] Field of Search ........................... 244/53 R; 60/262, 60/271, 226.3, 226.1, 226.2

[56] References Cited

U.S. PATENT DOCUMENTS

| 3,025,025 | 3/1962 | Duttmann . |
| 3,160,368 | 12/1964 | Young et al. . |
| 3,318,095 | 5/1967 | Snell . |
| 4,222,234 | 9/1980 | Adamson . |
| 4,222,235 | 9/1980 | Adamson et al. . |
| 4,679,394 | 7/1987 | Taylor . |
| 5,297,388 | 3/1994 | Nightingale . |
| 5,383,332 | 1/1995 | Angel . |

Primary Examiner—Charles T. Jordan
Assistant Examiner—Tien Dinh
Attorney, Agent, or Firm—Young & Thompson

[57] ABSTRACT

An aircraft power plant for vertical take-off and landing comprises a jet propulsion unit having an air inlet and an exhaust outlet and incorporating a combustion chamber, a high pressure compressor for supplying air from the air inlet to the combustion chamber, a fuel inlet for supplying fuel to the combustion chamber, and a turbine coupled to drive the compressor and arranged to be driven by the exhaust gases passing from the combustion chamber to the exhaust outlet. Swivelling front nozzles are provided for selectively directing a proportion of air from a fan arrangement downwardly in front of the propulsion unit and swivelling rear nozzles are provided for selectively directing at least a proportion of the exhaust gases from the exhaust outlet downwardly to the rear of the propulsion unit, in order to effect lift on take-off or landing. The fan arrangement comprises a first fan for supplying air to the front nozzles and a second fan, positioned rearwardly of the first fan, for supplying air to the air inlet of the propulsion unit, as well as a shaft having a length which is chosen to position the front nozzles sufficiently far forward to produce the required moment about the aircraft centre of gravity. Such an arrangement provides a highly efficient power plant which can be accommodated within a narrow cross-section, and which can be implemented without requiring gearboxes, clutches or hot ducts.

13 Claims, 8 Drawing Sheets

FIG. 5A"

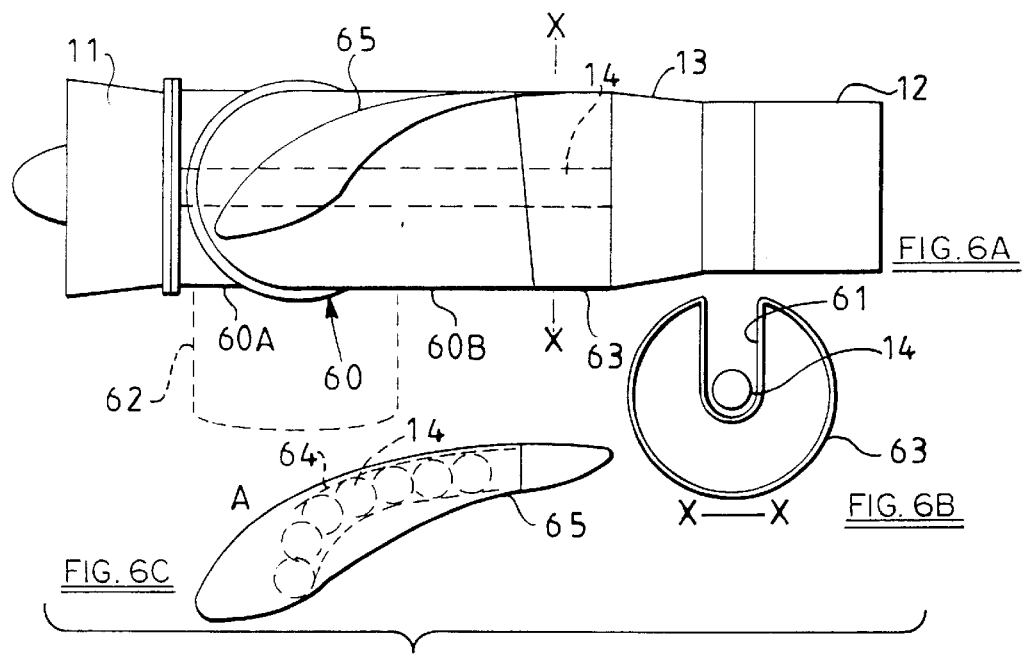
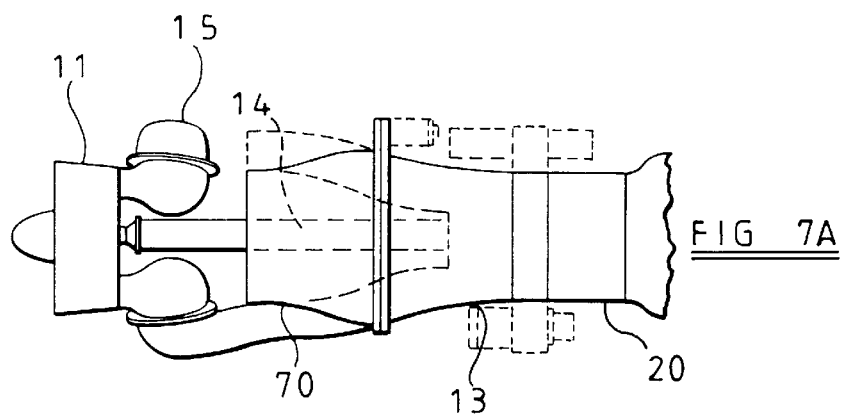
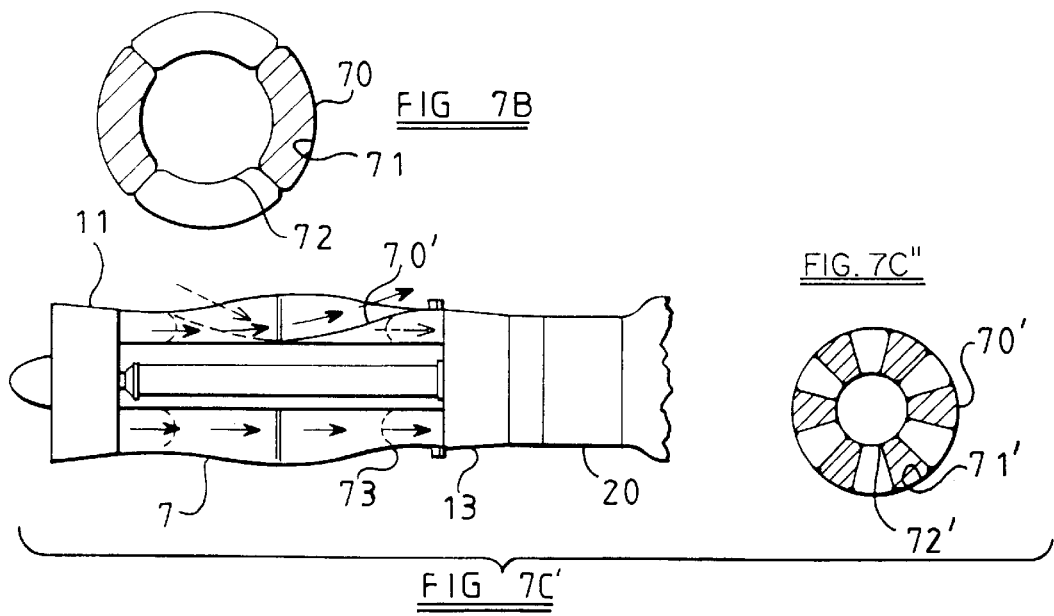

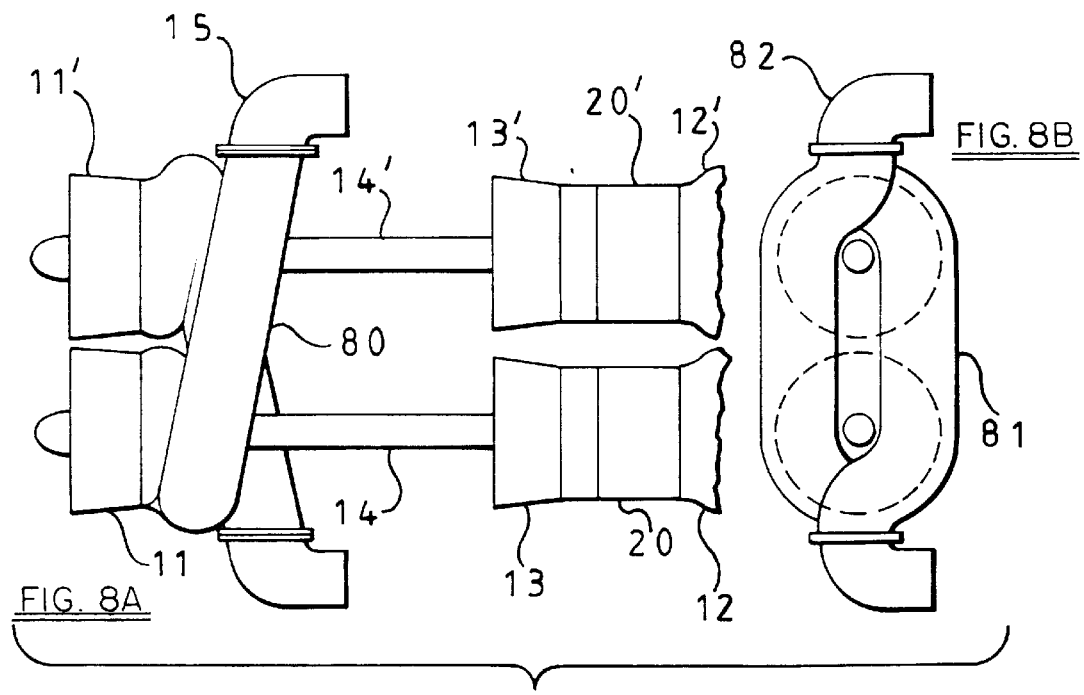
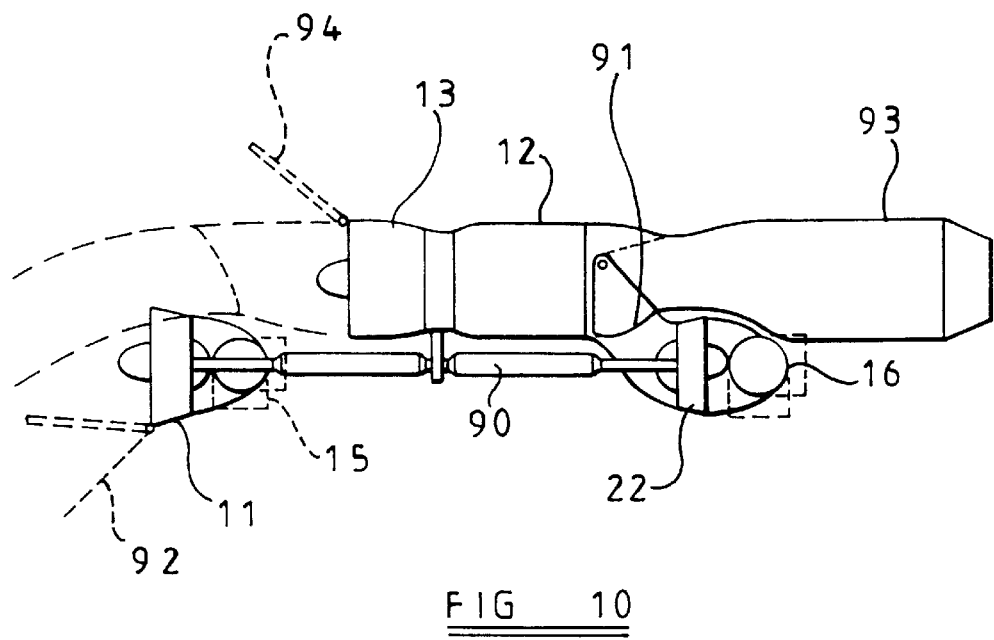

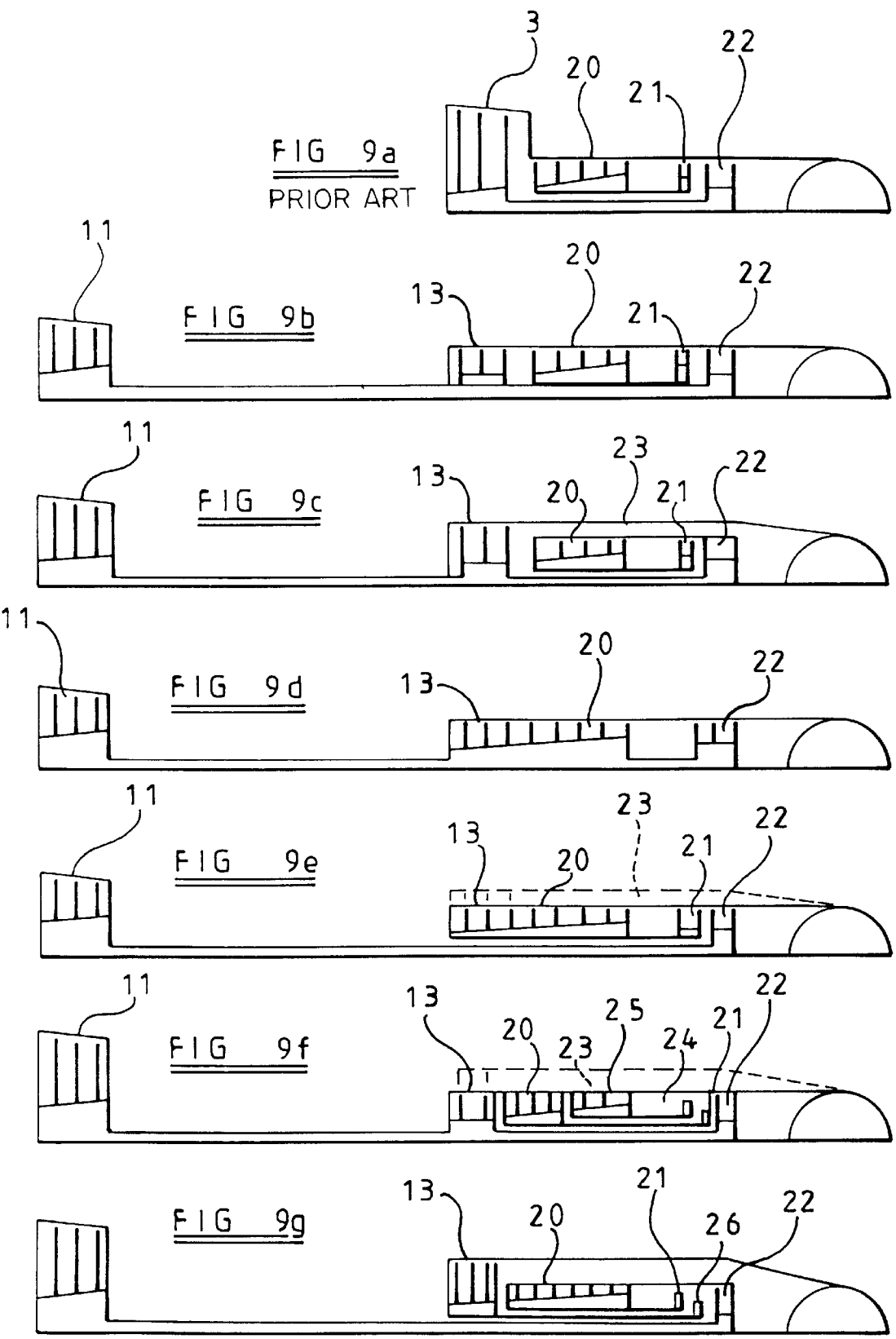

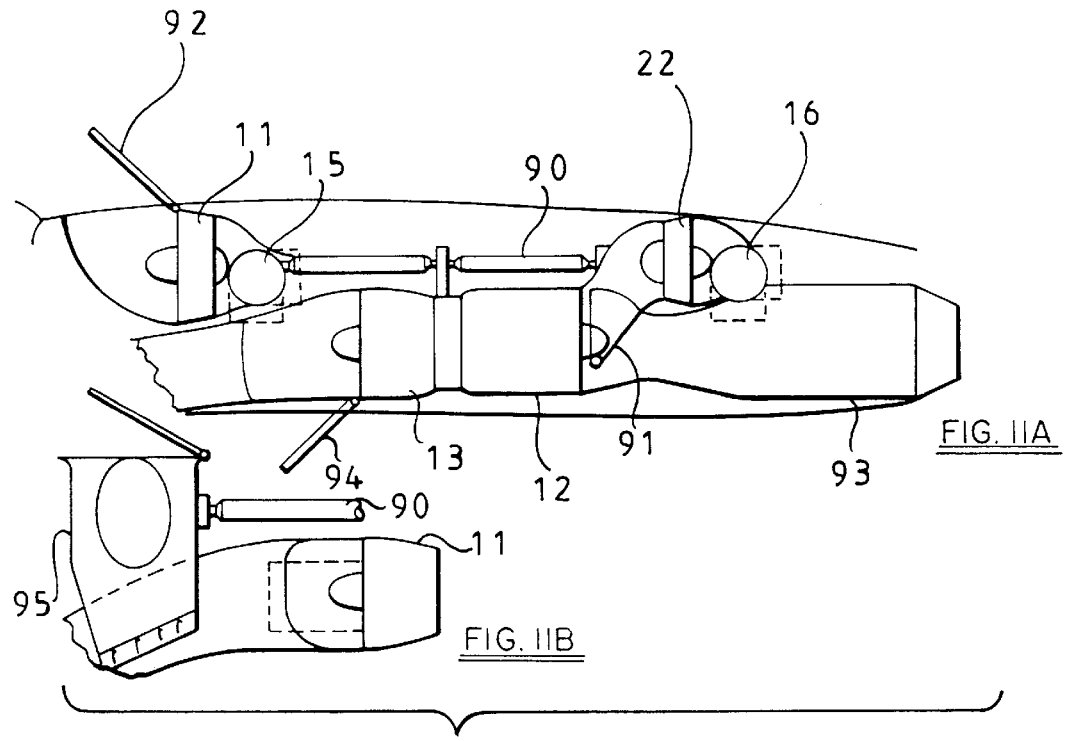
FIG. 11A
FIG. 11B
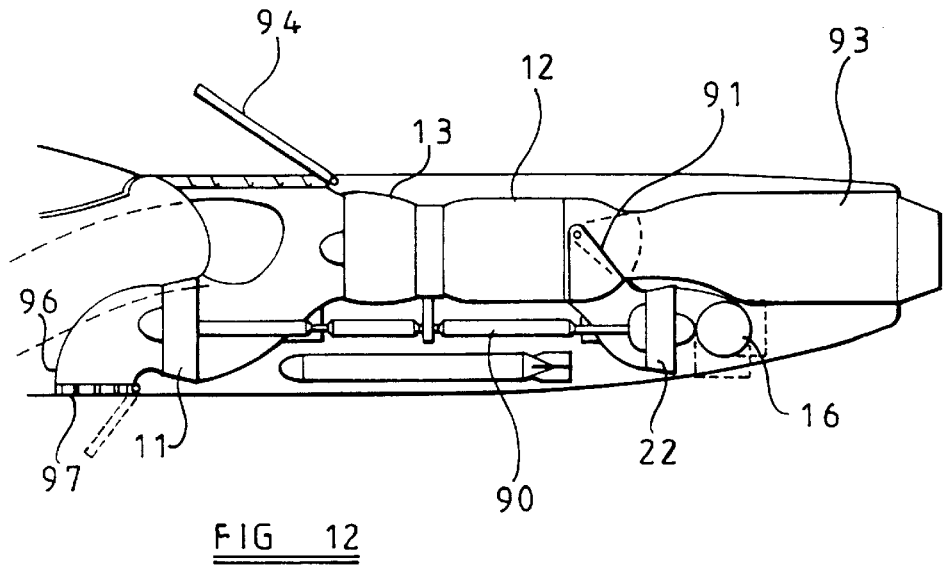
FIG 12

POWER PLANTS

This invention relates to power plants and is more particularly, but not exclusively, concerned with power plants for vehicles, such as aircraft or boats.

SUMMARY OF THE INVENTION

According to the present invention there is provided a power plant comprising a core engine having an axis and an air inlet located on the axis, fan means for supplying air to the air inlet of the engine, and nozzle means for selectively directing a proportion of the air from the fan means either axially of the engine or transversely of the axis in front of the engine, wherein the fan means comprises a first fan for supplying air to the nozzle means, and a second fan, positioned rearwardly of the first fan, for supplying air to the air inlet of the engine.

The invention also provides an aircraft power plant for vertical take-off and landing comprising a jet propulsion unit having an air inlet and an exhaust outlet and incorporating a combustion chamber, compressor means for supplying air from the air inlet to the combustion chamber, a fuel inlet for supplying fuel to the combustion chamber, and turbine means coupled to drive the compressor means and arranged to be driven by the exhaust gases passing from the combustion chamber to the exhaust outlet, fan means for supplying air, and front and rear nozzle means for selectively directing a proportion of the air from the fan means downwardly in front of the propulsion unit and for selectively directing at least a proportion of the exhaust gases from the exhaust outlet downwardly to the rear of the propulsion unit to effect lift on take-off or landing, wherein the fan means comprises a first fan for supplying air to the front nozzle means, and a second fan, positioned rearwardly of the first fan, for supplying air to the air inlet of the propulsion unit.

If it is assumed that 40% of the fan air is ingested by the high pressure compressor of the propulsion unit in the current Pegasus power plant, the front nozzles must therefore pass 60% of the fan air. Accordingly, by analogy, in use of the dual fan arrangement of the present invention, the first fan, which is provided for supplying air to the front nozzles, need pass only 60% of the air flow of the single fan of the Pegasus power plant, with the result that the first fan need have only 60% of the cross-sectional area of the fan used in the Pegasus power plant. Furthermore the first fan may be driven directly by a relatively small diameter shaft coupled to the hub of the second fan without requiring a gearbox, and with the length of the shaft being chosen to position the front nozzles sufficiently far forward to produce the moment required about the centre of gravity of the aircraft. Also the front nozzles can be located substantially further inwardly in relation to the centre line of the aircraft as compared with the Pegasus arrangement. The smaller tip diameter of the first fan, as compared with the fan of the Pegasus arrangement, additionally gives scope for higher rotational speeds and potentially reduced weight.

The first and second fans may be disposed coaxially with respect to the propulsion unit, and may be arranged to be driven by the turbine means. For example the first and second fans may be driven by a common drive shaft which is rotatable by the turbine means. Alternatively the first and second fans may be driven by separate coaxial shafts which are rotatable by the turbine means.

However the first fan may alternatively be axially offset from the propulsion unit, and may be arranged to be driven by the turbine means by means of a drive shaft extending externally of the propulsion unit.

Furthermore it is preferred that the front nozzle means is adjustable between a lift position in which the air is directed downwardly by the front nozzle means and a cruise position in which the air is directed substantially horizontally by the front nozzle means. The rear nozzle means may also be adjustable between a lift position in which the exhaust gases are directed downwardly and a cruise position in which the exhaust gases are directed substantially horizontally.

In one embodiment of the invention there is provided, upstream of the front nozzle means, diverter valve means adjustable, in the cruise position of the front nozzle means, between a stooge cruising position in which the air from the first fan is directed to the front nozzle means and a high thrust position in which the air from the first fan is directed to boost the supply of air to the air inlet of the propulsion unit. Preferably the diverter valve means is arranged to direct the air from the first fan towards the second fan in the high thrust position.

In an alternative embodiment of the invention there is provided, downstream of the front nozzle means, diverter duct means with which the front nozzle means is communicable in the cruise position so that the air from the first fan is directed by the diverter duct means to boost the supply of air to the air inlet of the propulsion unit. Preferably the diverter duct means is arranged to direct the air from the first fan towards the second fan when the front nozzle means is in the cruise position.

In a further development the diverter duct means is adjustable between a stooge cruising position in which the air from the front nozzle means is directed rearwardly externally of the air inlet of the propulsion unit and a high thrust position in which the air from the front nozzle means is directed to boost the supply of air to the air inlet of the propulsion unit. For example the diverter duct means may be adjustable by being rotated about a central axis.

In a further development a plenum chamber is provided intermediate the first and second fans for supplying air to the first fan in a forward direction and for supplying air to the second fan in a rearward direction.

BRIEF DESCRIPTION OF THE DRAWINGS

In order that the invention may be more fully understood, reference will now be made, by way of example, to the accompanying drawings, in which:

FIGS. 6A, 6B and 6C are a diagrammatic representation from one side of a still further embodiment in accordance with the present invention;

FIGS. 7A, 7B, 7C' and 7C" are a diagrammatic representation from above of another embodiment in accordance with the present invention, together with a variant thereof;

FIGS. 8A and 8B are a diagrammatic representation from above of another embodiment in accordance with the invention constituting a twin-engined power plant;

FIG. 9 shows diagrammatic examples of possible engine configurations with coaxial remote shaft driven fans; and FIGS. 10 to 12 are diagrammatic representations from one side of three further embodiments in accordance with the invention.

DETAILED DESCRIPTION OF THE DRAWINGS

Short take-off, vertical landing (STOVL) aircraft are advantageous in a number of applications, and particularly in applications in which a long runway is not available for take-off and landing of the aircraft. As is well known, the Pegasus power plant, which has been developed by Rolls Royce for such aircraft and has had many years operational service, comprises, as shown in the diagrammatic representation from above of FIG. 1 of the accompanying drawings, a turbojet propulsion unit 2, a large fan 3 (low pressure compressor) for boosting the high pressure compressor of the basic propulsion unit and supplying excess air to two diametrically opposed swivelling front nozzles 4, and two diametrically opposed swivelling rear nozzles 5 to which the exhaust gases of the propulsion unit 2 are supplied. During take-off and landing, the front and rear nozzles are directed vertically downwards so that the resultant thrust due to the excess air supplied to the front nozzles 4 and the exhaust gases supplied to the rear nozzles 5 supports and lifts the aircraft on the four jets produced by the four nozzles. During normal cruising of the aircraft, the nozzles are directed horizontally so that the resultant thrust acts to propel the aircraft forwardly.

However modern aircraft designs have elongate fuselages providing only a narrow cross-section for the nozzle pairs, and in addition there is a need for the nozzle pairs to be spaced far apart to enable a large moment to be produced by the front nozzles. In the Pegasus power plant, large ducts can be provided for conducting air from the fan to forward sited front nozzles. However such ducts are difficult to accommodate in narrow fuselage aircraft designs, as well as being inefficient with a summated air turning angle of 360° as both the ducts and the nozzles must conduct an air flow originating from a diameter in excess of the diameter of the high pressure compressor. Similar problems arise with the rear nozzles, although these can be solved by the use of a single mitred nozzle at the rear of the propulsion unit.

These drawbacks can be overcome by the various power plant arrangements in accordance with the invention described below with reference to FIGS. 2 to 9, all of which make use of a turbojet propulsion unit of known type, as also used in the prior art Pegasus power plant, comprising a generally cylindrical outer casing having an air inlet at its forward end and an exhaust outlet at its rear end and incorporating a combustion chamber, a high pressure compressor immediately downstream of the air inlet for supplying air from the air inlet to the combustion chamber, a fuel inlet for supplying fuel to the combustion chamber, and a turbine immediately downstream of the combustion chamber driven by the exhaust gases passing from the combustion chamber to the exhaust outlet and coupled to drive the high pressure compressor.

Figure 2:
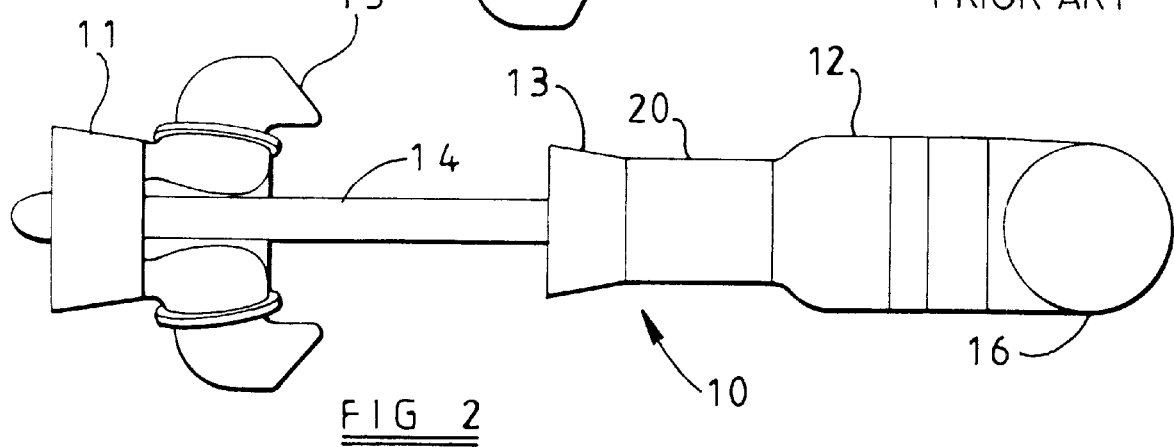
FIG. 2 is a diagrammatic view from above of the basic layout of a power plant in accordance with the present invention.

The basic layout of a power plant 10 in accordance with the present invention will now be described with reference to FIG. 2 which shows a propulsion unit 12 having a high pressure compressor 20, and first and second fans 11 and 13 coupled together by a relatively narrow shaft 14 for driving the first fan 11. The first fan 11 feeds air to swivelling front nozzles 15 only, and the shaft 14 has a length which is chosen to position the front nozzles 15 sufficiently far forward to produce the required moment about the aircraft centre of gravity. Furthermore advantage is taken of only having to clear the relatively small diameter shaft 14 to position the front nozzles 15 substantially closer to the aircraft centre line than the corresponding front nozzles of the prior art Pegasus arrangement.

For comparison purposes only, it might be envisaged that the first fan would require only 60% of the air flow, and hence of the cross-sectional area, of the fan used in the prior art Pegasus arrangement, whereas the second fan 13 would require only 40% of the air flow, and hence of the cross-sectional area, of the Pegasus fan. The core air supplied to the high pressure compressor 20 of the propulsion unit 12 may consist additionally of bypass air to suit certain applications.

Figure 1:
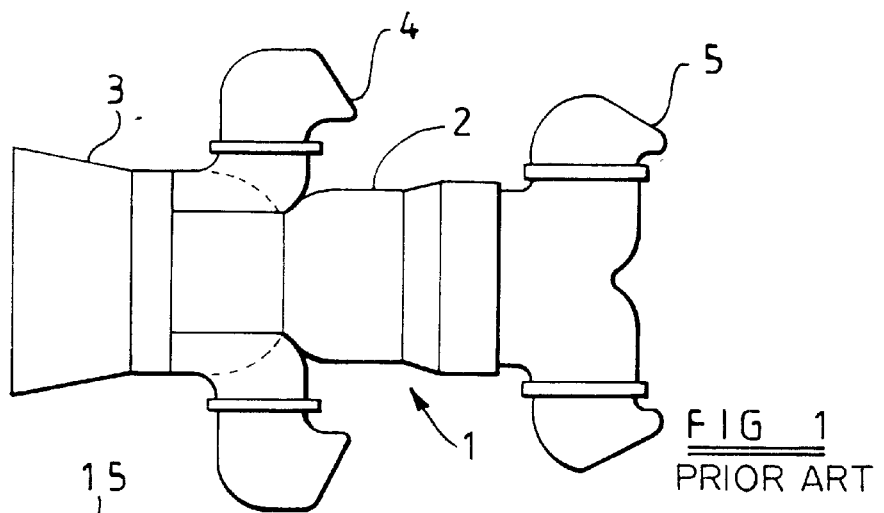
FIG. 1 is a diagrammatic view from above of the prior art Pegasus power plant.

The exhaust gases from the propulsion unit 12 are supplied to a rear nozzle unit 16 which may comprise a pair of swivelling rear nozzles similar to those shown in FIG. 1 or alternatively a single mitred rear nozzle provided with a known three bearing arrangement permitting vectoring of the exhaust gases continuously from the horizontal to the vertical.

It should be noted that, in accordance with the arrangement of the present invention, all main assemblies are used for all flight conditions and thus no parasitic deadweight is carried during any flight phase. Furthermore the arrangement requires no gearboxes, clutches or hot ducts and does not exacerbate ground erosion problems.

Figure 2A:
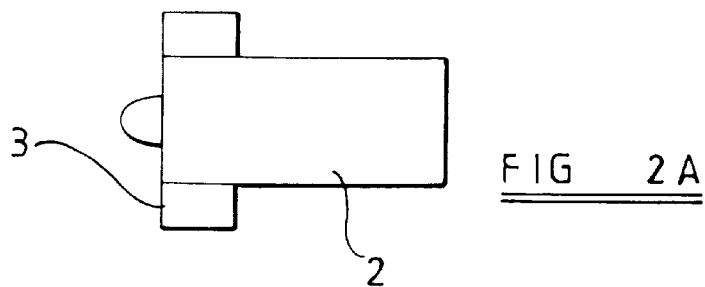
FIGS. 2A and 2B are explanatory diagrams comparing the basic layout of the present invention with the prior art layout.
Figure 2B:
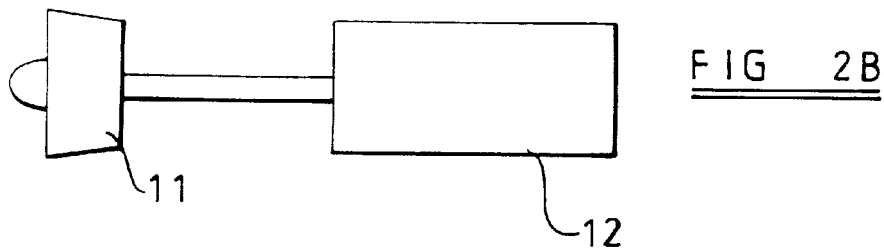

FIG. 2A diagrammatically illustrates the prior art layout of FIG. 1, and is intended to show that the shaded portion of the fan 3 supplies air to the front nozzles only, whereas the remainder of the fan 3 supplies air to the propulsion unit 2 which in turn supplies exhaust gases to the rear nozzles. FIG. 2B diagrammatically shows the layout in accordance with the invention of FIG. 2 for comparison purposes, and it will be appreciated that, in this case, the fan 11 is physically separated from the propulsion unit 12 (and from its associated fan 13) and serves to supply air to the front nozzles only. This arrangement permits similar performance to be obtained but provides more scope for adjusting moments about the centre of gravity, as well as substantially reducing fuselage cross-sectional area, thus enhancing aircraft performance. It is envisaged that little or no weight increase would be obtained as snubbers would not be required and this, coupled with the reduced diameter of the intermediate casing and nozzle chamber, would offset any weight increases due to the dispersed layout. Normally it would be expected that supersonic speeds would require the additional thrust obtained by plenum chamber burning which would require a variable throat for the front nozzles.

Even though the split low pressure compressor arrangement of the invention could serve to reduce frontal area by about 40%, a radar grid would still be needed to supply stealth capability.

Figure 2C:
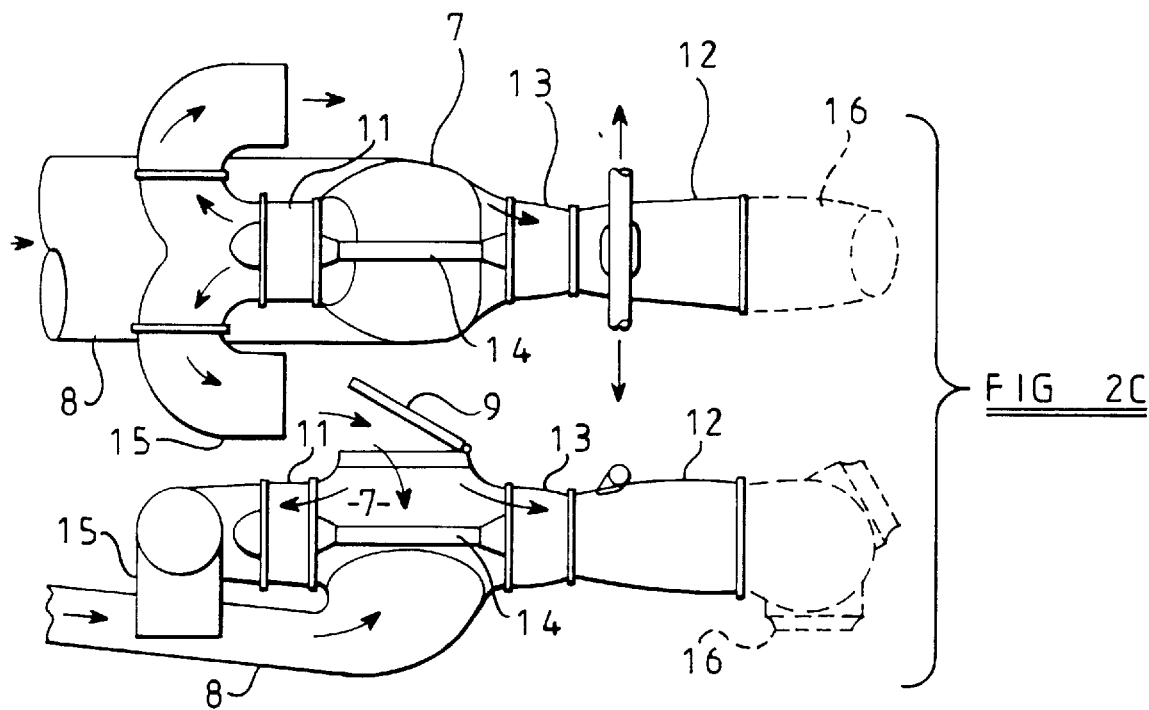
FIG. 2C is a diagrammatic representation from above and from one side of an embodiment in accordance with the invention.

FIG. 2C shows plan and elevational views of an embodiment of the invention in which a plenum chamber 7 is positioned intermediate the first and second fans 11 and 13 and air is supplied to the plenum chamber 7 by way of an air intake duct 8, the first fan 11 being reversed so that air from the plenum chamber 7 is supplied by the fan 11 to the front nozzles 15 which are positioned forwardly of the first fan 11. At the same time air from the plenum chamber 7 is supplied by the second fan 13 in the opposite direction to the propulsion unit 12. The masking of the air intake to the plenum chamber 7 by means of the long duct 8 enhances the stealth capability. Although the air delivery to the front nozzles 15 by way of the first fan 11 involves slightly higher pressure loss, this is offset by the appreciable overall gains in service. An air intake flap 9 is operable to admit air to both fans 11 and 13 in low velocity flight modes since, in the absence of such air ramming, there would otherwise be insufficient air volume throughput. The use of a simple flip-flop vane control for attitude correction is made possible by the fact that ready access to the plenum chamber 10 is available, and this also makes plenum chamber burning and its attendant nozzle area adjustment mechanism more tenable. Impingement problems from the front nozzles 15, which supply about half engine thrust, can be eased by toeing out the nozzles 15 by a small angle. The resultant axial thrust loss is small. For example 1° toe-out results in 0.01% loss, whereas 3° toe-out results in 0.07% loss (even 8° results in a loss of only 1°).

FIGS. 9a–9g show various shaft arrangements for driving the fans. In the known Pegasus arrangement shown in FIG. 9a), the single fan 3 and the high pressure compressor 20 are driven by turbines 21 and 22 using a coaxial two-shaft arrangement (one shaft contrarotating). A comparable coaxial two-shaft arrangement may be used in the power plant of the present invention, as shown in FIG. 9b), with the turbine 22 driving both fans 11 and 13. A similar arrangement is shown in FIG. 9c) but with the second fan 13 being enlarged so that excess air is diverted along an annular bypass duct 23 to the turbine exhaust to modify the cycle and produce a cooler jet. In the arrangement of FIG. 9d) the compressor 20 and fans 11 and 13 are driven by a single turbine 22 using a single shaft, whereas in the arrangement of FIG. 9e) the fan 11 is driven by the turbine 22 but the fan 13 and the compressor 20 are driven by a separate turbine 21. In the arrangement of FIG. 9f) two compressors 20 and 25 are driven by separate turbines 21 and 24, and the fans 11 and 13 are driven by the turbine 22. Finally, in the arrangement of FIG. 9g), the compressor 20 and the fans 11 and 13 are driven by three separate turbines 21, 22 and 26.

Figure 3:
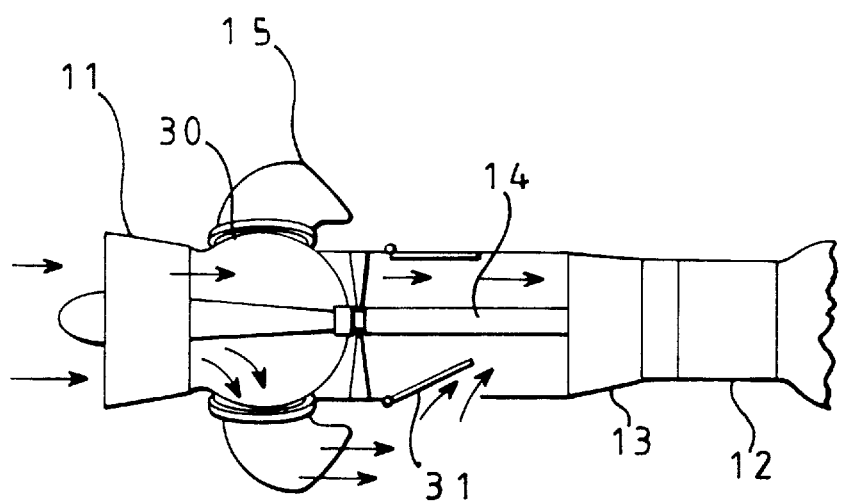
FIG. 3 is a diagrammatic representation from above of a first embodiment in accordance with the invention.

In a further embodiment of the invention shown in FIG. 3, a diverter valve 30 is associated with each of the front nozzles 15 so that, when the nozzles 15 are in the horizontal position, the diverter valve 30 may be placed either in the position shown in the bottom half of the figure in order to produce a high bypass ratio engine for stooge cruising, or in the alternative position shown in the top half of the figure in which the valve 30 is rotated to cut off air supply to the nozzles 15 and fully boost the core engine for high thrust requirements. For many operational requirements there is no need to install a costly re-heat system having a high fuel requirement. In a variant of this arrangement blow-in flaps 31 are provided which may open to admit air to the second fan 13 when the diverter valve 30 is in the position shown in the bottom half of the figure. It will be appreciated that the two fans 11 and 13 effectively operate in parallel in the first, stooge cruising operational mode and in series in the second, high thrust operational mode.

Figure 4:
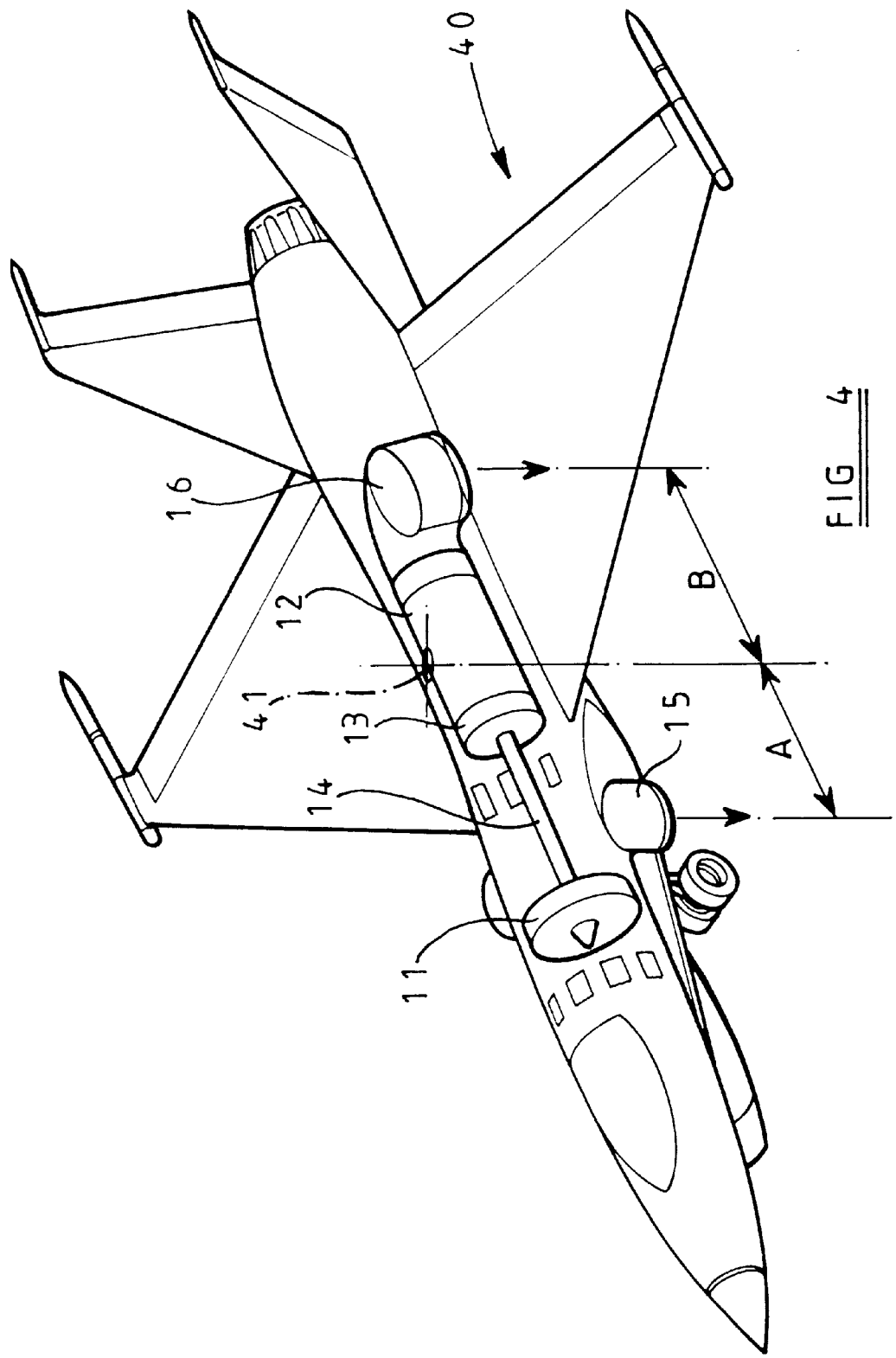
FIG. 4 is a diagram showing a possible installation layout of the power plant in accordance with the invention.

FIG. 4 shows a possible layout of such a power plant in a typical aircraft 40 indicating the positioning of the first fan 11 and the front nozzles 15 relative to the centre of gravity 41. The front nozzle assemblies shown may replace the canard front elevons provided in many modern aircraft.

Figure 5:
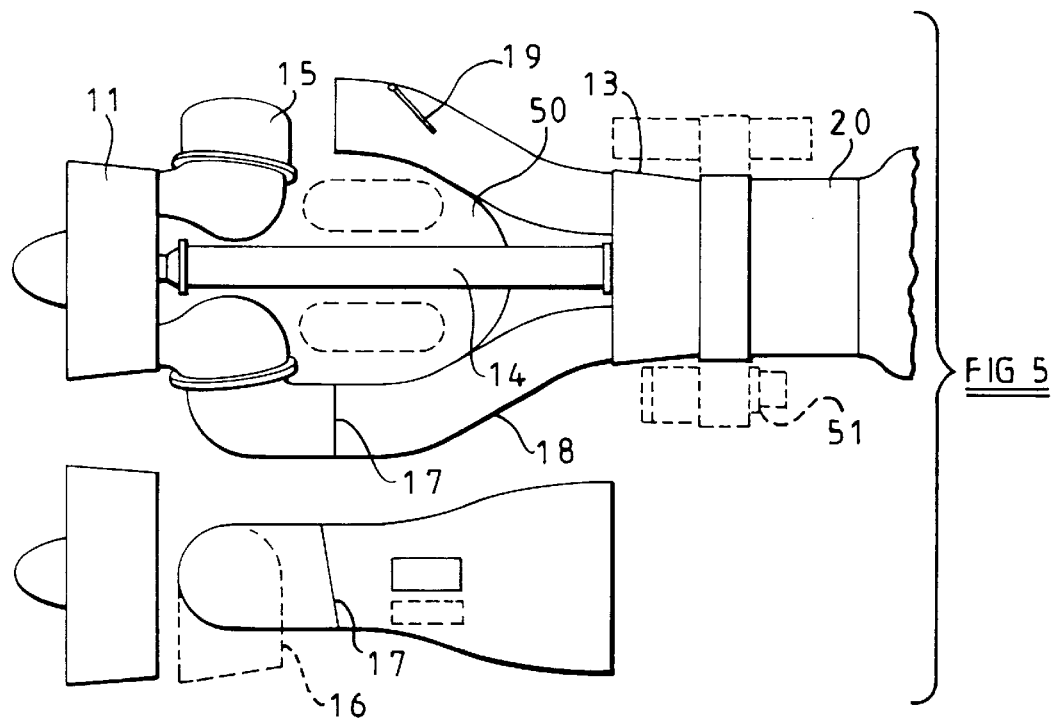
FIG. 5 is a diagrammatic representation from above of a further embodiment in accordance with the present invention, FIGS. 5A' and 5A" showing a variant of this embodiment in elevational and plan views.

Although it is much simpler to provide diverter valves at the cold end of the power plant, as described above with reference to FIG. 3, than at the hot end, that is in the vicinity of the exhaust outlet, it is preferable to avoid using such diverter valves if a different arrangement can be adopted producing substantially the same results. FIG. 5 shows a further embodiment of the invention utilising the nozzles 15 themselves as a means of air diversion. In the top half of the figure the nozzle 15 is shown directed vertically downwardly in the vertical take-off mode (as shown more clearly in broken lines at 16 in the side view shown at A), whereas the nozzle 15 is shown directed horizontally in the bottom half of the figure so as to be coupled by way of a joint 17, such as a scarfjoint, to a diverter duct 18 for conducting the air flow from the first fan 11 to the second fan 13. Blow-in flaps 19 may again be provided if required for the input of air to the second fan 13. The resulting well 50 on the centre line need not be a disadvantage as it can be used for landing, wheel stowage, etc. Furthermore the diverter ducts 18 do not increase the cross-sectional area as they do not protrude beyond the shadow of the nozzles 15, and in any case accessories 51 are provided which protrude from the sides of the power plant.

Figure 5A:
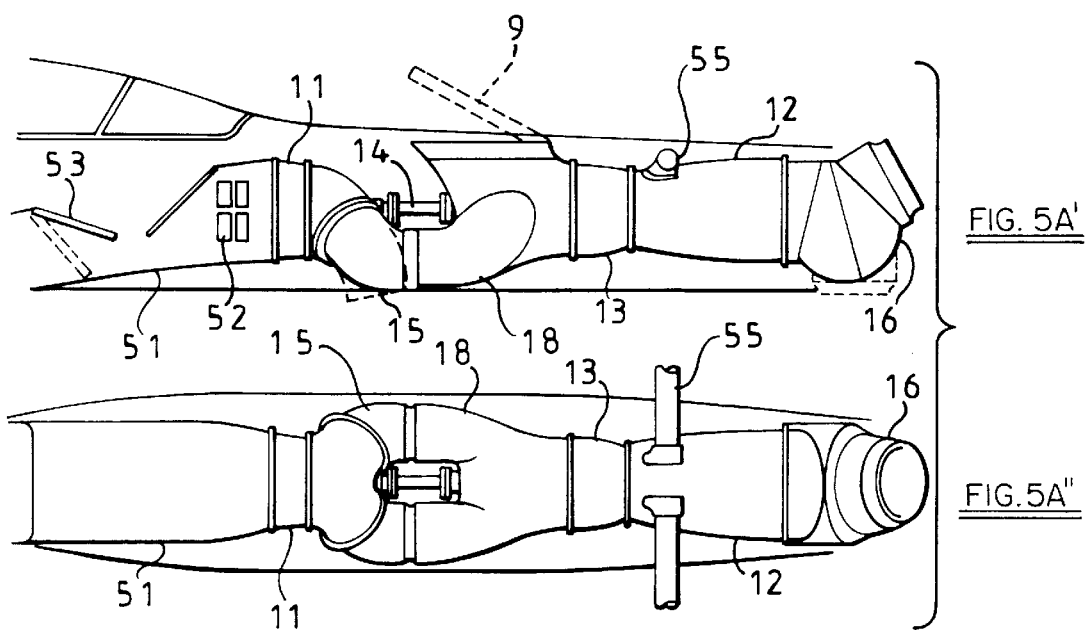

FIGS. 5A' and 5A" show elevation and plan views of a variant of the embodiment of FIG. 5 in which air is supplied to the first fan 11 by way of an air intake duct 51 provided with blow-in flaps 52, and in which delivery of air to the fan 11 during normal cruising is controlled by flaps 53 which vary the intake throat area. The flaps 53 control the amount of air passing to the fan 11 with the correct recovery, depending upon 20 forward aircraft velocity, as well as being capable of shutting off the air intake duct 51 for ground running to prevent the ingress of debris (air intake then being by way of the air intake flap 9 and/or auxiliary flap doors 52. When the twin front nozzles 15 are rotated to a position coupling the two fans 11 and 13 in series, the resulting interconnecting ducts provide in effect convergent/divergent nozzles with a break joint at the throat in each case. Throttling of the air intake to the first fan 11 during change over from the vertical take-off mode to the normal forward flight mode prevents surging etc., although careful development is required to prevent break-away on convex surfaces. Furthermore roll control valves and nozzles 55 are provided to give biased vertical lift for the purpose of sideways tilting of the aircraft. With both such nozzles pointing vertically downwards, assistance may also be given to the vertical lift provided by the main nozzles.

In a further embodiment of the invention shown in side view in FIGS. 6A–6C, in order to decrease the cross-sectional area in the vicinity of the nozzles, the nozzle(s) are formed by a mitred nozzle member 60 capable of being placed in communication with a diverter duct 63 provided with a shaped recess 61 through which the shaft 14 extends. The nozzle member 60 is swivellable (by having its two parts 60A and 60B rotated in phased opposite directions) between a flight position in which the air from the fan 11 is conducted to the fan 13 by way of the duct 63, and a vertical take-off position, as shown by the broken lines 62 in the figure, for directing the air flow from the fan 11 vertically downwards. The nozzle member 60 is provided with a shaped slot 64 enabling swivelling of the part 60B relative to the shaft 14 as best shown in the diagram at A, the lot 64 being covered by a shroud 65 to prevent escape of air transversely of the slot 64.

FIG. 7A shows a further variant in which a rotary duct 70 is provided for conducting air from the nozzles 15 either rearwardly externally of the second fan 13 in the stooge flight mode (high bypass low speed condition) or towards the second fan 13 in the boosted flight mode, as shown in broken lines in FIG. 7A, in dependence on the orientation of the rotary duct 70. As shown in the cross-sectional view of FIG. 7B, the rotary duct 70 includes bifurcated passages 71 for placing the nozzles 15 in communication with the second fan 13 when the rotary duct 70 is in a first rotational position, and diverting recesses 72 for placing the nozzles 15 in communication with the atmosphere when the rotary duct 70 is in a second rotational position at 90° to the first position. In an alternative arrangement shown in FIGS. 7C'and 7C", a multi-branch rotary duct 70' having passages 71' and recesses 72' may be used in place of the rotary duct 70 already described, a rotary diverter part 73 being rotatable relative to a stationary part 74 for directing air from the first fan 11 to the passages 71' or recesses 72' in the flight modes.

FIGS. 8A and 8B show a twin engine arrangement in which two engines 12, 12' are provided for reliability, and two first fans 11, 11' and two second fans 13, 13' are provided for vertical thrust and for supply of air to the high pressure compressors 20, 20' of the engines 12, 12'. In this arrangement cross-over ducting 80 is provided for conducting the air from the first fans 11, 11' to the front nozzles 15, and in addition cross-over ducting 81 (shown in end view in FIG. 8B) is provided for conducting the exhaust gases to the rear nozzles 82, so as to enable balanced vertical thrust to be provided in the event of an engine failure. The cross-over ducting 80 can be tailored into a small cross-sectional area as the ducting only needs to clear the drive shafts 14, 14'. Furthermore the cross-over ducting could be used for a reheat system rather than having to use the more restrictive plenum chamber burning system.

FIG. 10 shows an arrangement in which the first fan 11 is axially offset from the second fan 13 and is driven by a turbine 22 which is similarly axially offset and which is coupled to the first fan 11 by an external drive shaft 90. The exhaust gases from the propulsion unit 12 are supplied to the turbine 2 and rear nozzles 16 in the vertical take-off and cruising modes by a diverter valve 91 which is in the form of a flap of part cylindrical shape pivotally supported by sector-shaped support arms. The turbine 22 thus serves to drive the first fan 11 by means of the drive shaft 90, with the front and rear nozzles 15 and 16 being directed downwardly in the vertical take-off mode and horizontally in the cruising mode. Furthermore the first fan 11 is provided with a trap door 92 which is an open position during the vertical take-off and cruising modes but which may be closed to blank off the air intake to the fan in the high thrust mode when operation of the first fan 11 is not required and when the diverter valve 91 is operable to divert the exhaust gases previously supplied to the turbine 22 and rear nozzles 16 so as to remove drive from the turbine 22 and direct all the exhaust gases towards a reheat unit 93. The second fan 13 is provided with an auxiliary air intake flap 94 (or alternatively a blow-in door) for vertical take-off and low speed operation.

Such an arrangement enables the first fan 15 and turbine 22 to be bypassed when their operation is not required, so as to enhance high thrust performance. Furthermore such a design allows simple modification of the power plant, by removal of the first fan 11, the drive shaft 90 and the turbine 22, when only a CTOL version of the aircraft is required. The ability to enable VTOL and CTOL versions of an aircraft to be produced using the same basic design of propulsion unit provides significant advantages in terms of savings in design costs, etc. Whilst the arrangement requires a deeper fuselage, this might in any case be considered necessary for internal weapon and stores stowage.

FIGS. 11A and 11B show a similar external drive shaft arrangement, but with the arrangement inverted so that the drive shaft 90 is positioned above the propulsion unit 12. In the variant shown in the lower part of this figure, the first fan 11 and front nozzles 15 are replaced by a vertical fan unit 95 to which drive is imparted by the drive shaft 90 by way of a clutch and gearbox.

FIG. 12 shows a further variant in which the first fan 11 is reversed so as to supply air to downwardly directed nozzles 96 provided with vanes 97 for vector control. This arrangement shortens the aircraft fuselage and therefore assists stealth capability when the first fan 11 is shut off in the forward propulsion mode in which operation of the first fan 11 is not required. Of course the diverter valve 91 and trap doors/flaps may be partially open in low speed or transition modes (i.e. transition from horizontal to vertical and vice versa).

Whilst such arrangements require the use of a long drive shaft external to the propulsion unit, they avoid the need for a drive shaft passing through the propulsion unit and thus the need for central apertures extending through the rotor disks and bearing assemblies of the propulsion unit for accommodating the drive shaft. This in turn permits the rotor disks and bearing assemblies to be of smaller and lighter construction.

The use of the axially remote first fan in each of the above described embodiments of the invention provides a number of practical advantages. Firstly it enables much of the proven technology used in relation to the Pegasus power plant to be re-used, and enables easy moment adjustment in the design phase to suit airframe requirements. Furthermore no additional around erosion problems should arise, as are encountered in use of separate lift engine arrangements. Additionally higher fan rotational speed is possible due to the smaller diameter of the first fan, and also potential weight reduction. Furthermore no gearboxes, clutches or large hot ducts are required, and no shutters or louvres are needed, as may be required for vertically mounted lift engines or fans. In addition the reduced frontal fan area reduces the radar cross-section of the aircraft, and the use of series/parallel coupling of the first and second fans provides full fan boost to the core engine, long range due to the stooge flight possibility, possible omission of a reheat system for many requirements, and allows simple duct insertion in place of diverter valve assemblies.

Although the above embodiments are all concerned with short take off, vertical landing (STOVL) aircraft, it should be appreciated that the basic assemblies of the invention are also applicable to helicopters and ducted fan and turboprop engines.

I claim:

1. An aircraft power plant comprising:
   a jet propulsion unit having an air inlet, an exhaust outlet, a combustion chamber, a compressor for supplying air from the air inlet to the combustion chamber, a fuel inlet for supplying fuel to the combustion chamber, a turbine coupled to the compressor and arranged to be driven by the exhaust gases passing from the combustion chamber to the exhaust outlet, a first fan for supplying air and a front nozzle for selectively directing a proportion of air from the first fan downwardly in front of the propulsion unit, a second fan for supplying air to the air inlet, and a rear nozzle for selectively directing at least a proportion of exhaust from the exhaust outlet downwardly to the rear of the propulsion unit; and
   diverter duct means downstream of the front nozzle for directing air from the first fan through the front nozzle to the air inlet to boost a supply of air to the air inlet.

2. A power plant according to claim 1, wherein the first and second fans are disposed coaxially with respect to the propulsion unit.

3. A power plant according to claim 1, wherein the first and second fans are arranged to be driven by the turbine.

4. A power plant according to claim 1, wherein the first and second fans are driven by a common drive shaft which is rotatable by the turbine.

5. A power plant according to claim 3, wherein the first and second fans are driven by separate coaxial shafts which are rotatable by the turbine.

6. A power plant according to claim 1, wherein the first fan is axially offset from the propulsion unit.

7. A power plant according to claim 6, wherein the first fan is arranged to be driven by the turbine by means of a drive shaft extending externally of the propulsion unit.

8. A power plant according to claim 1, wherein the front nozzle is adjustable between a lift position in which the air is directed downwardly by the front nozzle and a cruise position in which the air is directed substantially horizontally by the front nozzle.

9. A power plant according to claim 1, wherein the rear nozzle is adjustable between a lift position in which the exhaust gases are directed downwardly and a cruise position in which the exhaust gases are directed substantially horizontally.

10. A power plant according to claim 1, wherein the diverter duct means is arranged to direct the air from the first fan towards the second fan when the front nozzle is in a cruise position.

11. The power plant of claim 1, wherein said diverter duct means comprises a rotatable section of the first nozzle and a duct leading to the air inlet, the rotatable section selectively moving the first nozzle between a first position directing the air from the first fan downwardly in front of the propulsion unit and a second position directing the air from the first fan into the duct leading to the air inlet to boost the supply of air to the air inlet.

12. The power plant of claim 1, wherein said diverter duct means comprises a portion rotatable about a central axis.

13. An aircraft power plant comprising:

a jet propulsion unit comprising an air inlet, an exhaust outlet, a combustion chamber, and a turbine arranged to be driven by the exhaust gases passing from the combustion chamber to the exhaust outlet;

a diverter duct upstream of the air inlet and in communication therewith;

a first fan upstream of the diverter duct;

a front nozzle between the first fan and the diverter duct and in communication with the first fan, the first nozzle being rotatable about a central axis between a position directing a proportion of air from the first fan downwardly in front of the propulsion unit and a position directing a proportion of air from the first fan into the diverter duct;

a second fan for supplying air to the air inlet; and a rear nozzle for selectively directing at least a proportion of exhaust from the exhaust outlet downwardly to the rear of the propulsion unit.

* * * * *